US012188270B2

(12) United States Patent
Sintonen et al.

(10) Patent No.: US 12,188,270 B2
(45) Date of Patent: Jan. 7, 2025

(54) TAILPIECE ATTACHING ARRANGEMENT AND LOCK ARRANGEMENT

(71) Applicant: iLOQ Oy, Oulu (FI)

(72) Inventors: Tommi Sintonen, Oulu (FI); Juha Kyrönlampi, Oulu (FI); Matti Ylitalo, Oulu (FI); Samuli Maronen, Oulu (FI)

(73) Assignee: iLOQ Oy, Oulu (FI)

( * ) Notice: Subject to any disclaimer, the term of this patent is extended or adjusted under 35 U.S.C. 154(b) by 139 days.

(21) Appl. No.: 18/116,719

(22) Filed: Mar. 2, 2023

(65) Prior Publication Data

US 2024/0295137 A1 Sep. 5, 2024

(51) Int. Cl.
*E05B 9/08* (2006.01)
*E05B 17/04* (2006.01)

(52) U.S. Cl.
CPC .............. *E05B 9/086* (2013.01); *E05B 17/04* (2013.01)

(58) Field of Classification Search
CPC ........ E05B 9/00; E05B 9/086; E05B 15/0013; E05B 15/06; E05B 17/0004; E05B 17/04; E05B 17/041
See application file for complete search history.

(56) References Cited

U.S. PATENT DOCUMENTS 1,947,386 A * 2/1934 Fraim ..................... E05B 29/00 292/358
2,877,638 A * 3/1959 Muttart ............... E05B 27/0014 70/371
3,078,706 A 2/1963 Russell
4,672,828 A * 6/1987 Theriault ................ E05B 9/086 70/451
6,105,405 A * 8/2000 Westwinkel ............ E05B 17/04 70/386
6,644,076 B2 * 11/2003 Huang .................... E05B 17/04 70/371
6,883,356 B1 * 4/2005 Wu ......................... E05B 17/04 70/379 R
7,003,994 B2 2/2006 Ruan
7,357,010 B1 * 4/2008 Huang .................... E05B 17/04 70/DIG. 62
8,127,579 B2 * 3/2012 Mannella .............. E05B 17/041 70/379 R (Continued)

FOREIGN PATENT DOCUMENTS

JP 2007-536449 12/2007

OTHER PUBLICATIONS

Jul. 29, 2024 Search Report issued in European Patent Application No. 24160491.7, pp. 1-6.

(Continued)

*Primary Examiner* — Christopher J Boswell
(74) *Attorney, Agent, or Firm* — Nixon & Vanderhye PC

(57) ABSTRACT

According to a first aspect of the invention, there is provided a tailpiece attaching arrangement (100) comprising a cylindrical frame (102), a cylindrical attaching member (104) and a locking member (106) wherein the cylindrical attaching member (104) is configured to attach the tailpiece (108) into the cylindrical frame (102), and the locking member (106) is configured to lock the attaching member (104). According to a second aspect of the invention, there is provided a lock arrangement (126) comprising the tailpiece attaching arrangement (100) and a lock cylinder (128).

13 Claims, 6 Drawing Sheets

(56) References Cited

U.S. PATENT DOCUMENTS

| | | | |
|---|---|---|---|
| 8,336,349 B2 | 12/2012 | Thimmappa et al. | |
| 9,309,692 B2 * | 4/2016 | Westwinkel | E05B 9/08 |
| 9,441,397 B2 | 9/2016 | Clifford et al. | |
| 10,329,797 B2 | 6/2019 | Huang et al. | |
| 12,049,770 B2 * | 7/2024 | Barker | E05B 17/048 |
| 2005/0011239 A1 * | 1/2005 | Lurie | E05B 17/04<br>70/369 |
| 2021/0222458 A1 | 7/2021 | Jones et al. | |

OTHER PUBLICATIONS

May 31, 2024 Search Report issued in International Patent Application No. PCT/EP2024/055208, p. 1-11.

* cited by examiner

TAILPIECE ATTACHING ARRANGEMENT AND LOCK ARRANGEMENT

FIELD

Various embodiments relate to a field of locks, especially tailpiece attaching arrangements.

BACKGROUND

There is a plurality of tailpiece types available in a market. The tailpiece is a replaceable component making possible to change the type of the tailpiece in a lock if needed. The tailpiece is removably coupled with the lock by an attaching arrangement. The known attaching arrangement of the tailpieces have some drawbacks especially from a usability point of view.

Hence, there is a need for more sophisticated solution for the attaching the tailpiece removably to the lock arrangement.

BRIEF DESCRIPTION

According to an aspect, there is provided subject matter of independent claims. Dependent claims define some embodiments.

One or more examples of implementations are set forth in more detail in the accompanying drawings and the description of embodiments.

LIST OF DRAWINGS

Some embodiments will now be described with reference to the accompanying drawings, in which FIG. 1A illustrates a tailpiece attaching arrangement according to an embodiment of the invention;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments.

Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

The applicant, iLOQ Oy, has invented many improvements for the electromechanical locks, such as those disclosed in various European and US patent applications and patents, incorporated herein as references in all jurisdictions where applicable. A complete discussion of all those details is not repeated here, but the reader is advised to consult those publications.

Nevertheless, the solution of the invention is aimed especially to the electromechanical locks, it may be applied in traditional locks as well.

According a first aspect of the invention, there is provided a tailpiece attaching arrangement comprising a cylindrical frame having an internal space configured to receive one end of a tailpiece, the cylindrical frame further comprises an internal thread on an internal surface, and a hole on an outer surface extending to the internal space. The arrangement further comprises a cylindrical attaching member having an external thread configured to be coupled with the internal thread of the cylindrical frame, and at least one locking protrusion extending substantially in a longitudinal direction of the attaching arrangement. The arrangement further comprises a locking member configured to be removably coupled with the cylindrical frame, wherein the locking member is configured to extend through the hole of the cylindrical frame into the internal space and contact with the at least one locking protrusion of the cylindrical attaching member. The cylindrical attaching member is configured, when coupled with the cylindrical frame by the threads, to prevent removal of the tailpiece from the internal space, and the locking member is configured, through the hole in the cylindrical frame, to contact with the at least one locking protrusion of the cylindrical attaching member to prevent rotation of the cylindrical attaching member in relation to the cylindrical frame at least in a first direction.

Figure 1A:
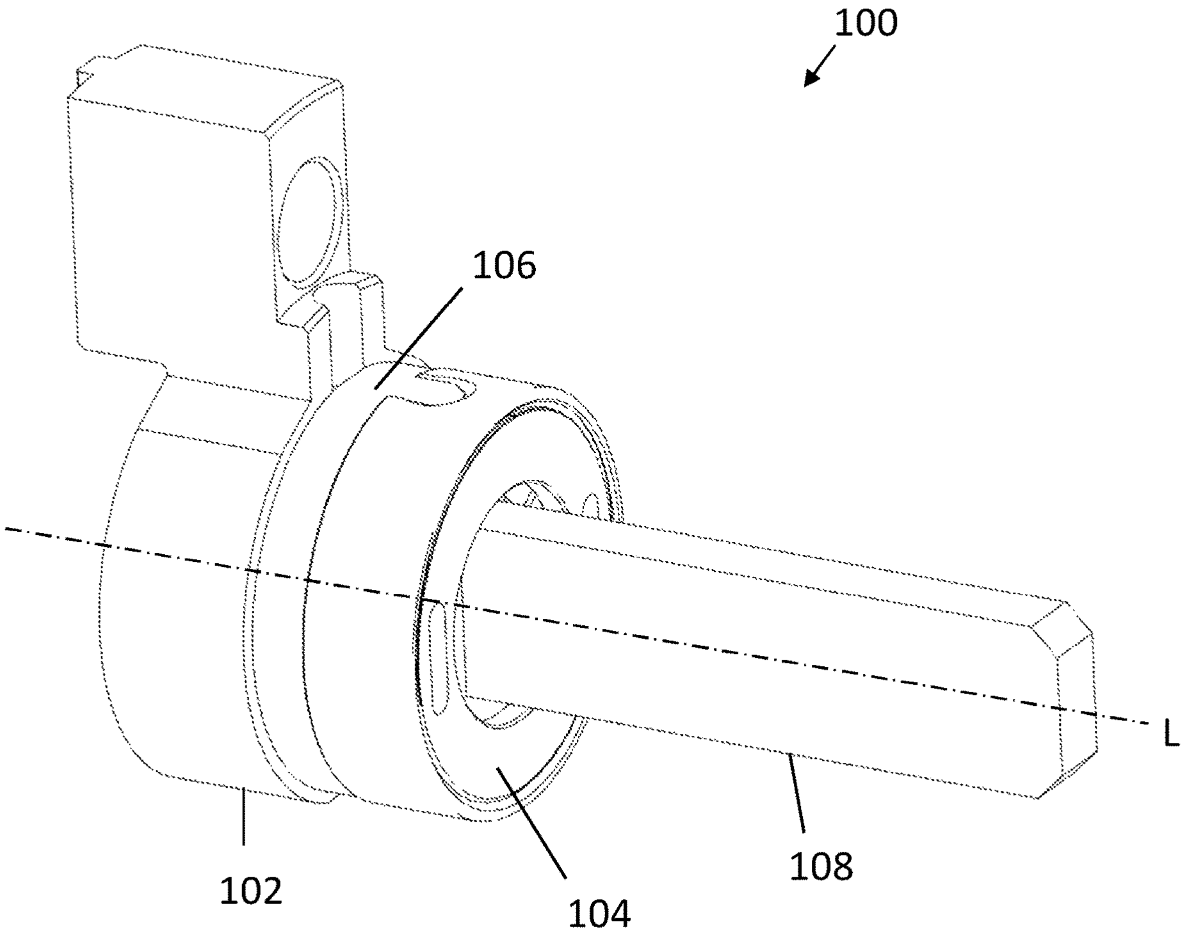
FIG. 1B illustrates an exploded view of the tailpiece attaching arrangement according to an embodiment of the invention.
FIG. 1C illustrates a cross section view of the tailpiece attaching arrangement according to an embodiment of the invention.
Figure 1B:
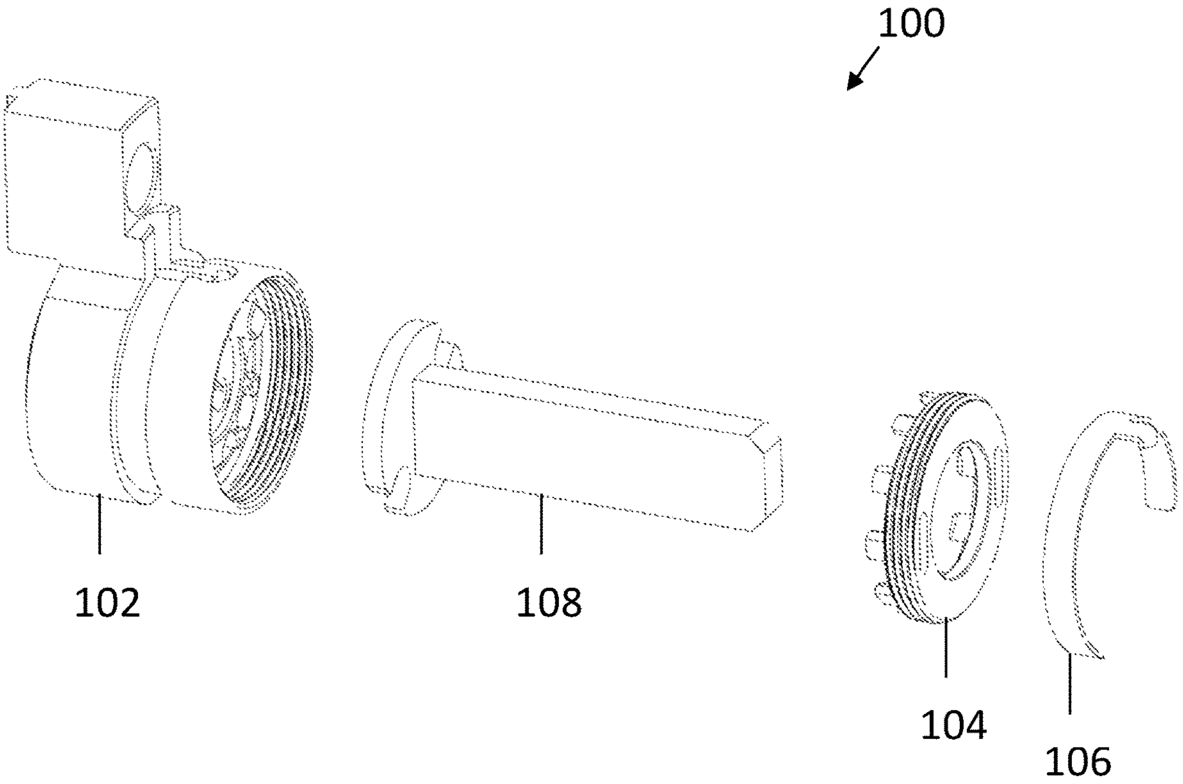

Let us first look at the tailpiece arrangement in an assembled state. The assembled state refers to an operating state of the arrangement to attach the tailpiece to the lock cylinder. The lock cylinder is not illustrated in Figures. FIG. 1A illustrates the tailpiece attaching arrangement 100 as it is in use. The tailpiece 108 is inserted inside the cylindrical frame 102 (also frame later in this application) and removal of the tailpiece 108 is prevented by the cylindrical attaching member 104. The cylindrical attaching member (also attaching member later in this application) is locked to the cylindrical frame 102 by the locking member 106. FIG. 1B illustrates the tailpiece attaching arrangement 100 in an unassembled state (an exploded view). The cylindrical frame 102 comprises the internal space IS having the internal thread IT on the internal surface IS, and the cylindrical attaching member 104 comprises the external thread OT on an outer surface OS2 wherein the cylindrical attaching member 104 and the cylindrical frame 102 are configured to be coupled together by the threads IT, OT. In other words, the cylindrical attaching member 104 can be rotated into the internal space of the cylindrical frame 102 by the treads IT, OT to prevent removal of the tailpiece 108 from the internal space IS of the cylindrical frame 102. The locking member 106, when interacting with the protrusion 112 of the attaching members 104, is configures to prevent rotation of the attaching member 104 at least in the first direction A.

In an embodiment, the cylindrical frame 102 is a separate part configured to be coupled with the lock cylinder 108. The frame may be removably coupled with the lock cylinder by screw, for example.

In another embodiment, the cylindrical frame 102 is an integral part of the lock cylinder 108. In other words, the lock cylinder forms the cylindrical frame.

Figure 5A:
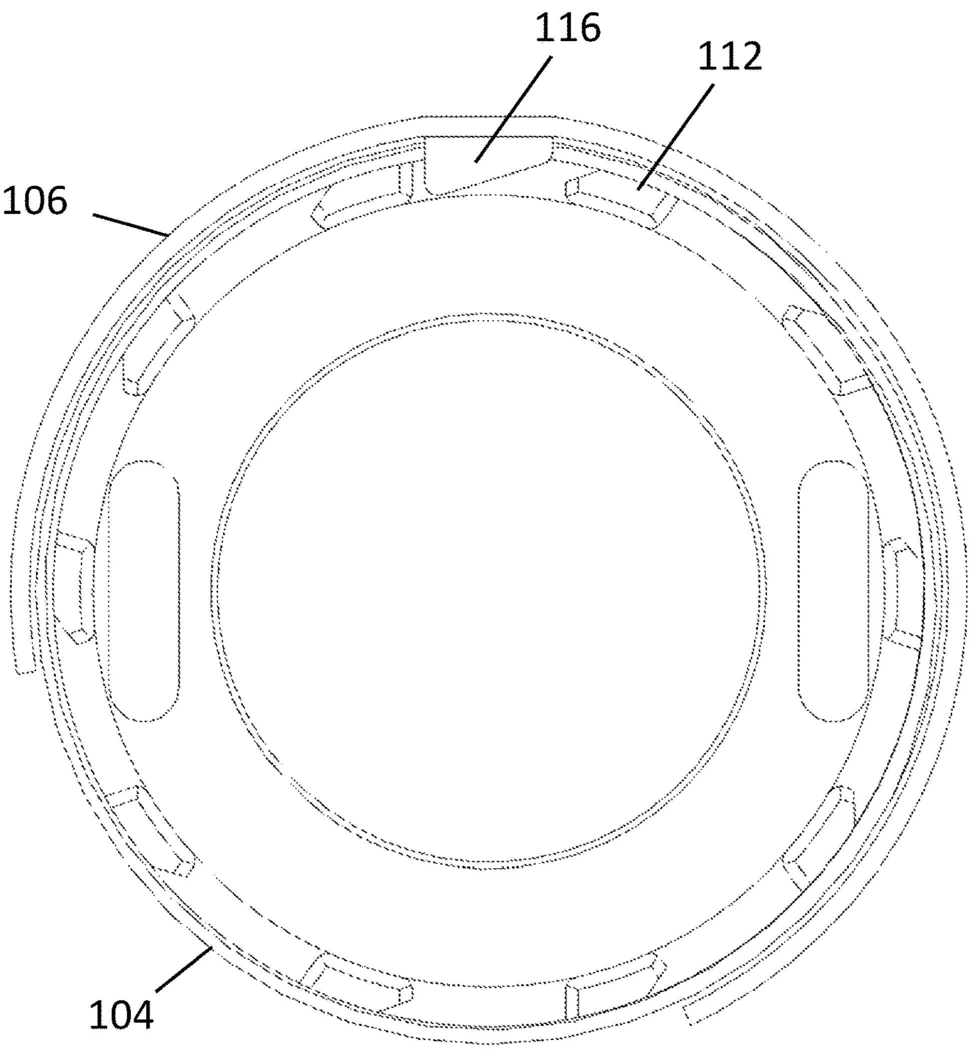
FIGS. 5A and 5B illustrate a locking of the tailpiece attaching arrangement according to an embodiment of the invention.
Figure 5B:
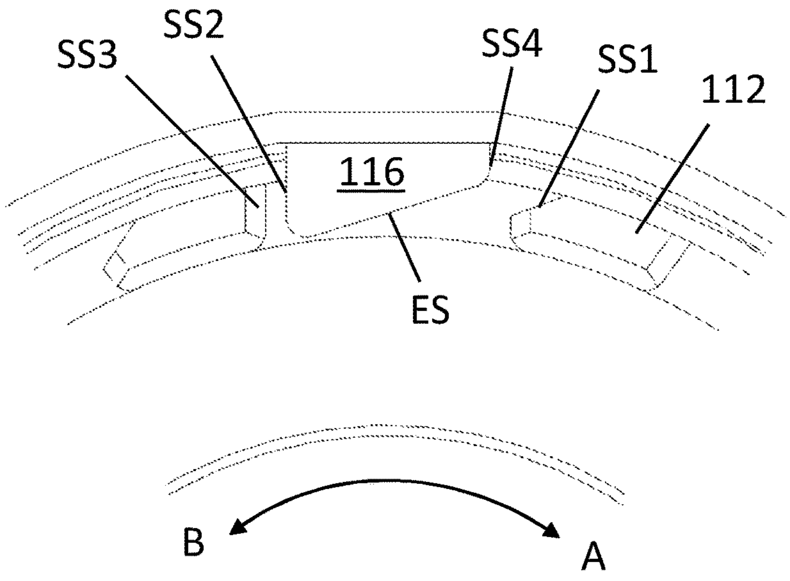

The rotation directions of the attaching member are illustrated in FIG. 5B. The first rotation direction A may be used to remove the attaching member from the frame, and the second rotation direction B may be used to install the attaching member into the frame.

The longitudinal direction L of the tailpiece attaching arrangement and its components is illustrated in FIG. 1, and the longitudinal direction may refer to a center line of the arrangement.

Figure 4:
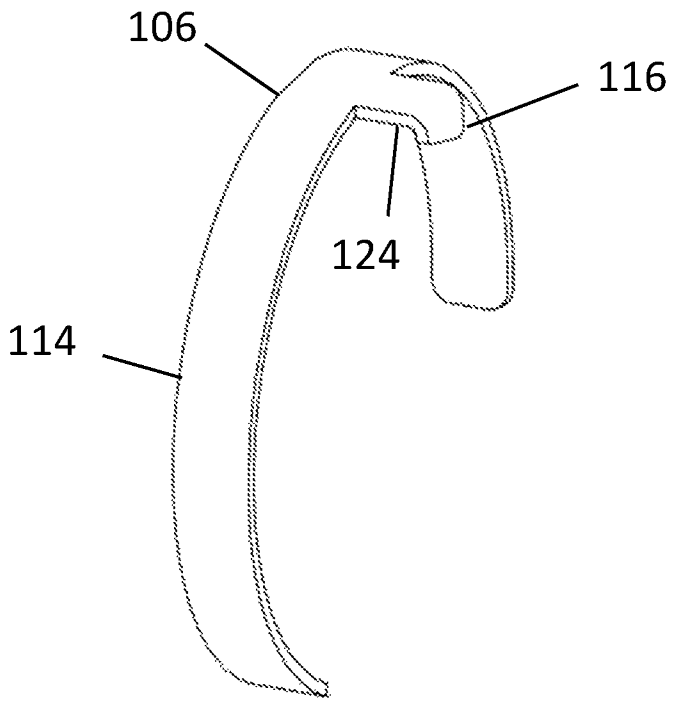

Let now look at FIG. 4, which illustrates the locking member according to an embodiment. The locking member 106 may be a resilient locking band having a curved body 114 with a locking claw 116. The curved body may be substantially C shaped configured to receive the frame. In other words, when the locking member is assembled to the frame, the cylindrical body of the frame is inside the curved locking band as illustrated in FIG. 1A, for example. The resilient refers to a spring kind of material which is elastic. In other words, it tries to return its original shape. The resilient locking band may be made of sheet metal, for example. The locking claw 116 is configured to extend from the locking band substantially perpendicularly in relation to the longitudinal direction L. When the locking band is assembled with the outer surface of the frame (as illustrated in FIG. 1A), the locking claw is configured to go throug the hole arranged on the outer surface of the frame and extend to the internal space of the frame. Then the locking claw can be in contact with the locking protrusion arranged in the attaching member inside the frame such that the claw prevents rotation of the attaching member. In other words, when the attaching member is rotated, the claw hits the locking protrusion that prevents or limits rotation at least in one direction.

Figure 2:
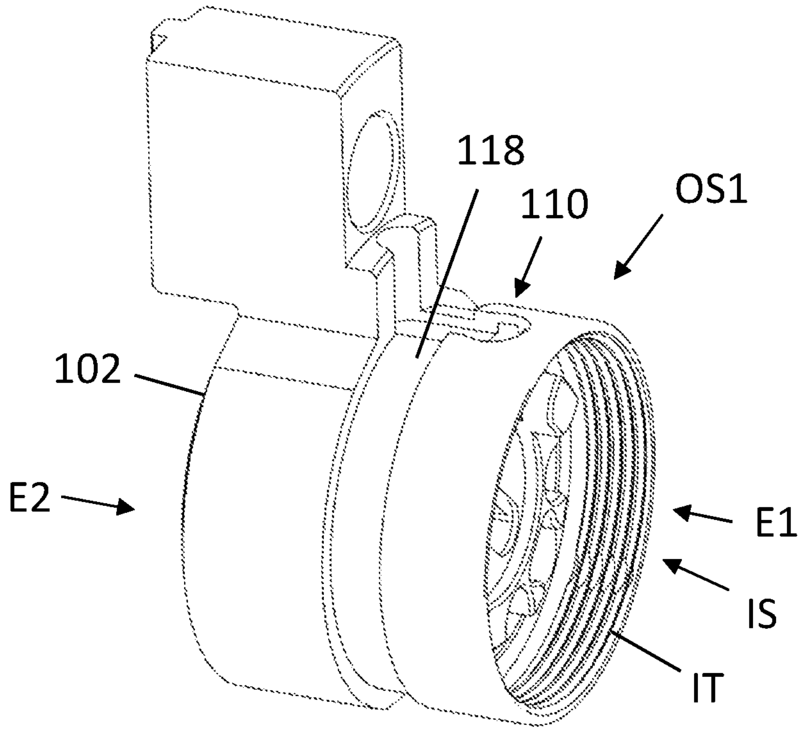
FIGS. 2, 3 and 4 illustrate components of the tailpiece attaching arrangement according to embodiments of the invention.

Referring now to FIG. 2 which illustrates the cylindrical frame in detail according to an embodiment. The cylindrical frame 102 further comprises a groove 118 on an outer surface OS1 configured to receive the locking band 106. As described above, when the locking band 106 is set into the groove 118 as illustrated in FIG. 1A, the locking claw 116 can interact with the at least one locking protrusion 112 of the attaching member 104 through the hole 110 to prevent rotation of the cylindrical attaching member 104 in relation to the cylindrical frame 102 at least in the first direction A. The groove may extend around a circumference of the cylindrical frame, or it may cover the circumference just partly.

FIGS. 5A and 5B illustrate the locking band and the attaching member in detail according to an embodiment. An end surface ES of the locking claw 116 comprises a first chamfer configured to enable rotation of the cylindrical attaching member 104 in a second direction B. In other words, a first side surface SS2 of the claw 116 is longer that the second side surface SS4 and hence the end surface ES is inclined (sloped). The first chamfer is configured to interact with the locking protrusion such that when the attaching member is rotated in the second direction, the locking protrusion hit the chamfered end surface and it can slide over the chamfer. Then the locking protrusion lifts the locking claw, and the attaching member can rotate despite the locking claw. Lifting may mean that the claw moves in a direction which is perpendicular to the longitudinal direction L, and it moves away from the attaching members. In other words, the locking claw does not prevent the rotation of the attaching member. As described above, the second rotation direction B may be used to install the attaching member into the frame, hence the first chamfer may enable installation of the attaching member but prevents opening. Then the locking member may already be assembled on the frame when the attaching member is assembled.

Still referring to FIGS. 5A and 5B, in an embodiment a first side surface SS1 of the locking projection 112 comprises a second chamfer configured to interact with the first chamfer of the locking claw 116 to enable rotation of the cylindrical attaching member 104 in the second direction B. The first side surface of the locking projection is chamfered such that the surface is substantially parallel with the end surface ES of the locking claw 116. Hence, when the attaching member is rotated in the second direction, the chamfer on the first surface of the projection hits the chamfer of the end surface of the claw. This lifts the locking claw up such that the attaching member can rotate in the second direction. So, the chamfer on the first side surface of the projection helps to lift the claw and enables rotation of the attaching member in the second direction.

Still referring to FIGS. 5A and 5B, in an embodiment, a side surface SS2 of the locking claw comprises a third chamfer, and a second side of the locking projection SS3 comprises a fourth chamfer, wherein the third and the fourth chamfers are configured to interact to prevent rotation of the cylindrical attaching member 104 in the first direction A. Hence, when the third and the fourth chamfers interacts, they prevent lifting of the claw which prevents rotation of the attaching member in the first direction. The fourth chamfer in the protrusion 112 may press down the claw.

Figure 3:
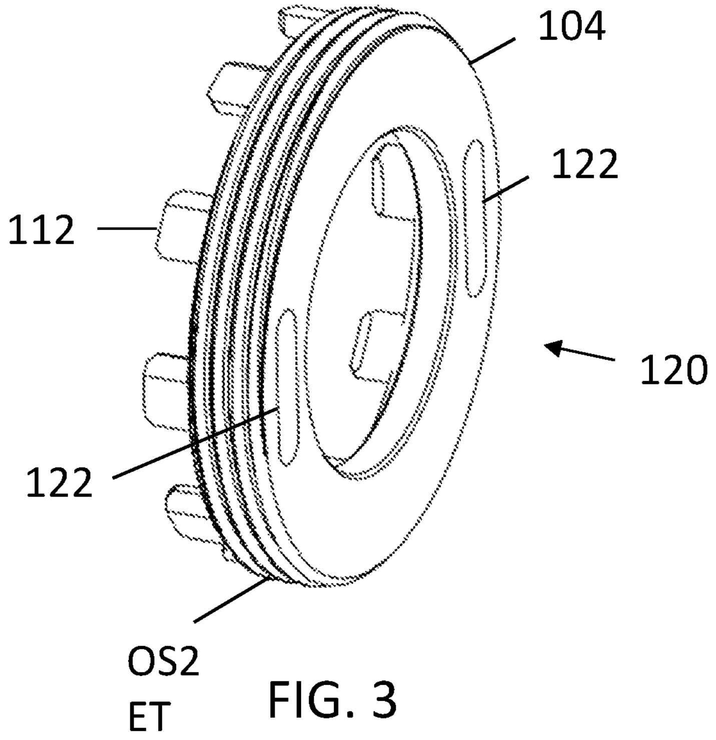

Referring to FIGS. 3 and 5A, in an embodiment the cylindrical attaching member 014 comprises a plurality of locking protrusions 112. There may be a gap between the protrusions configured to receive the locking claw. The gap between the protrusions may be a little larger that the size of the claw. This ensures that the attaching member cannot be rotated to the direction A much before the claw hits the protrusion and prevents rotation. One or more protrusions may be arranged in the vicinity of the outer surface of the attaching member. Outer surface refers to the curved surface having the external thread. Hence, the locking claw does not need to extend much to the inner space to get contact with the protrusion.

Referring now to FIG. 2, in an embodiment, the cylindrical frame 102 comprises a first and a second end E1, E2, wherein the first end is open to enable access of the tailpiece into the hollow interior. In other words, the first end is open, and the one end of the tailpiece can be inserted inside from the open end. The first end is configured to be closed by the attaching member.

Figure 1C:
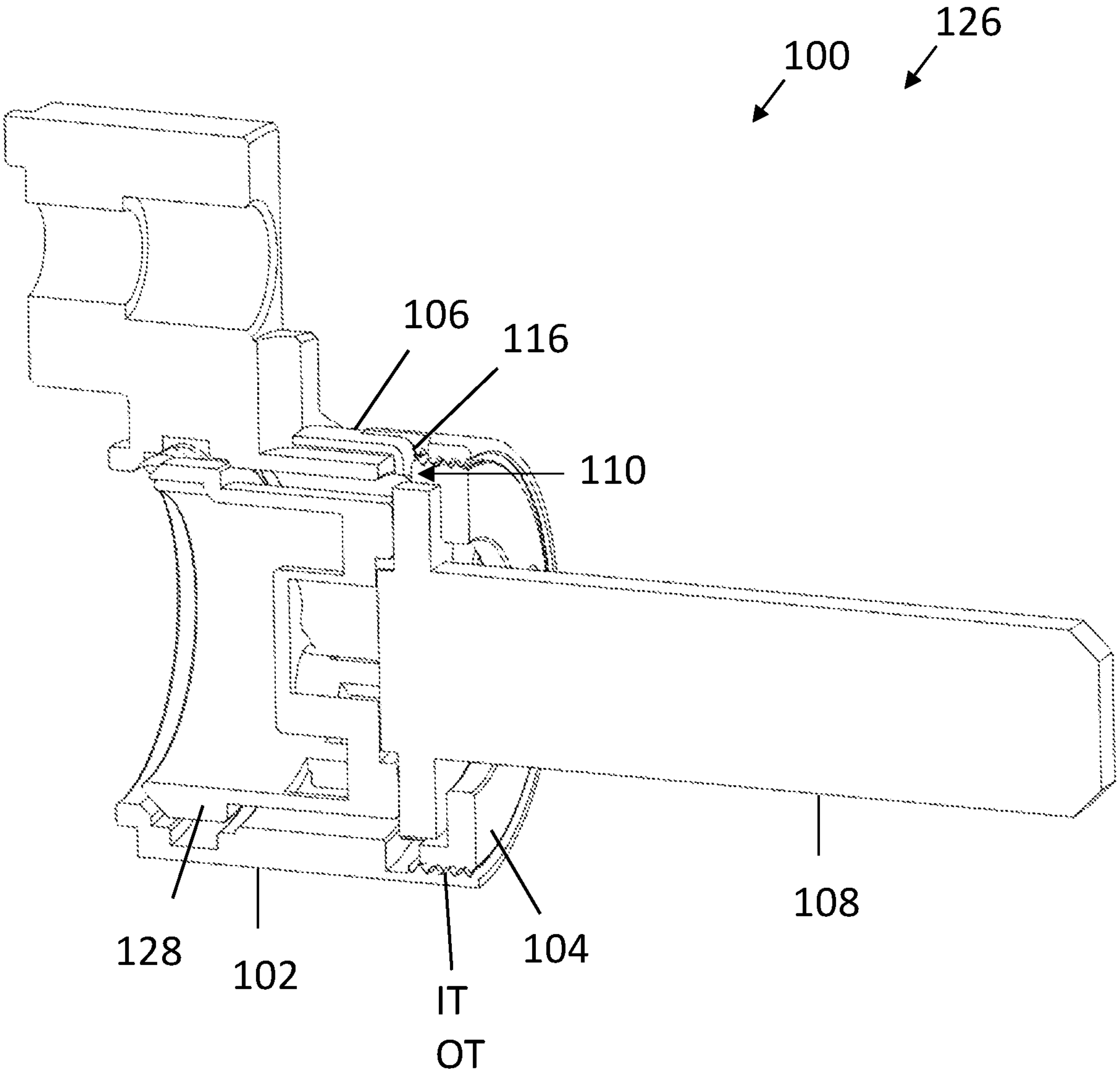

In an embodiment, illustrated in FIG. 1C, the second end E2 of the cylindrical frame 102 in the arrangement 100 is, at least partly, closed to prevent removal of the tailpiece 108 from the interior space IS. Then the end of the tailpiece which is in the inner space stays between the attaching member and the closed second end of the frame as illustrated in FIG. 1C. In a first embodiment, the frame may comprise a feature preventing removal of the tailpiece from the inner space. In a second embodiment, the second end is closed by a separate part like a body of the lock cylinder. In other words, when the tailpiece attaching arrangement is attached to the lock cylinder, the lock cylinder may close the second end of the frame preventing removal of the tailpiece from the internal space. The second end may further comprise one or more features to prevent rotation of the tailpiece in the inner space. The feature may comprise one or more projections configured to be coupled with one or more openings of the tailpiece which prevent rotation of the tailpiece.

Let us not look at FIG. 3, which illustrates the cylindrical attaching member 104 according to an embodiment. The cylindrical attaching member 104 may comprise an opening 120 for receiving the tailpiece 108. The tailpiece is an elongated part, and it may extend through the opening when coupled with the frame and attached to the frame by the attaching member as illustrated in FIG. 1A.

Still referring to FIG. 3, in an embodiment, the cylindrical attaching member 104 comprises one or more opening holes 122 to receive a tool to couple or uncouple the cylindrical attaching member 104 with the cylindrical frame 102. The opening hole may be a cavity, or it may extend through the attaching member in the longitudinal direction L. The tool may be used to rotate the attaching member on the threads of the frame to couple the attaching member with the frame or uncouple the attaching member from the frame.

Referring to FIG. 2, in an embodiment, the hole 110 in the frame 102 may be in the vicinity of the groove 118. In other words, the hole may not be in the groove, instead there may be a gap between the hole and the groove. The hole may be placed on the top of the frame. The top refers to a side of the frame that faces up in a normal operating position of the arrangement.

Referring now to FIG. 4, in an embodiment, the locking band comprises an extension 124 extending in the longitudinal direction L wherein the locking claw 116 is arranged in the extension 124. The extension of the locking band enables to set the claw into the hole that is in vicinity of the groove but is not in the groove. So, when the locking band is in the groove, the claw can reach the hole. The claw may be perpendicular to the extension.

According to a second aspect of the invention, there is provided a lock arrangement comprising a tailpiece attaching arrangement and a lock cylinder. The lock arrangement refers to an assembly comprising at least the lock cylinder and the tailpiece attaching arrangement for attaching the tailpiece with the lock cylinder. In addition to the lock cylinder, the lock arrangement may further comprise all other normal components of the door lock assembly, for example.

In an embodiment, the lock arrangement further comprises the tailpiece. The tailpiece may be the changeable component which type is selected according to the locks. In addition to the lock cylinder and the tailpiece attaching arrangement, the above-mentioned lock arrangement may comprise the tailpiece.

In an embodiment, the frame of the tailpiece attaching arrangement comprises means for attaching the frame to the lock cylinder. The frame my comprise a hole for receiving a screw for attaching the frame to the lock cylinder. This may be used to attach the whole tailpiece attachment arrangement with the lock cylinder.

The next example describes how the tailpiece attaching arrangement may be applied in a normal use. The tailpiece attaching arrangement is configured to attach the tailpiece to the lock cylinder. The tailpiece attaching arrangement can be coupled with the lock cylinder from the frame. One end of the tailpiece is set into the inner space of the frame and this end is closed by the attaching member. The inner space of the frame may comprise the inner thread for receiving the outer thread arranged in the attaching member. Hence the attaching member may be rotated inside the frame by the treads which prevent removal of the tailpiece from the inner space. The rotation of the attaching member to the first direction is prevented by the locking member. The locking member may be the locking band having the locking claw. The locking band may be set around the outer surface of the frame, the frame may further comprise the groove for the locking band. The locking band may comprise the locking claw which is configured to extend through the hole of the frame into the inner space of the frame. The locking claw is configured to be in contact with the locking protrusion arranged on the attaching members. This contact prevents the rotation of the attaching member in the first direction. The locking claw may be chamfered such that it allows rotation of the attaching member in the second direction. Hence, the tailpiece attaching arrangement allows tightening of the attaching member when the locking member is assembled but prevents untightening. The locking band (member) may also be removed when opening the attaching member to remove the tailpiece from the internal space.

The above-described invention solves many drawbacks of the known tailpiece attaching solutions. It provides the solution which is improves usability of the attaching arrangement but still provide strong attaching of the tailpiece.

It will be obvious to a person skilled in the art that, as the technology advances, the inventive concept can be implemented in various ways. The invention and its embodiments are not limited to the examples described above but may vary within the scope of the claims.

The invention claimed is:

1. A tailpiece attaching arrangement comprising:

a cylindrical frame having an internal space configured to receive one end of a tailpiece, the cylindrical frame further comprises an internal thread on an internal surface-, and a hole on an outer surface extending to the internal space;

a cylindrical attaching member having an external thread configured to be coupled with the internal thread of the cylindrical frame, and at least one locking protrusion extending substantially in a longitudinal direction of the attaching arrangement; and a locking member configured to be removably coupled with the cylindrical frame, wherein the locking member is configured to extend through the hole of the cylindrical frame into the internal space and contact with the at least one locking protrusion of the cylindrical attaching member, wherein the cylindrical attaching member is configured, when coupled with the cylindrical frame by the threads, to prevent removal of the tailpiece from the internal space, and the locking member is configured, through the hole, to contact with the at least one locking protrusion of the cylindrical attaching member to prevent rotation of the cylindrical attaching member in relation to the cylindrical frame at least in a first direction.

2. The tailpiece attaching arrangement of claim 1, wherein the locking member comprises a resilient locking band having a curved body and a locking claw.

3. The tailpiece attaching arrangement of claim 2, wherein the cylindrical frame further comprises a groove on an outer surface configured to receive the locking band such that the locking claw interacts with the at least one locking protrusion of the attaching member through the hole to prevent rotation of the cylindrical attaching member in relation to the cylindrical frame at least in the first direction.

4. The tailpiece attaching arrangement of claim 2, wherein the locking band comprises an extension extending in the longitudinal direction wherein the locking claw is arranged in the extension.

5. The tailpiece attaching arrangement of claim 1, wherein an end surface of the locking claw comprises a first chamfer configured to enable rotation of the cylindrical attaching member in a second direction.

6. The tailpiece attaching arrangement of claim 5, wherein a first side surface of the locking projection comprises a second chamfer configured to interact with the first chamfer of the locking claw to enable rotation of the cylindrical attaching member in a second direction.

7. The tailpiece attaching arrangement of claim 1, wherein a side surface of the locking claw comprises a third chamfer, and a second side of the locking projection comprises a fourth chamfer, wherein the third and the fourth chamfers are configured to interact to prevent rotation of the cylindrical attaching member in the first direction.

8. The tailpiece attaching arrangement of claim 1, wherein the cylindrical attaching member comprises a plurality of locking protrusions.

9. The tailpiece attaching arrangement of claim 1, wherein the cylindrical frame comprises a first and a second end, wherein the first end is open to enable access of the tailpiece into the hollow interior.

10. The tailpiece attaching arrangement of claim 9, wherein the second end of the cylindrical frame is, at least partly, closed to prevent removal of the tailpiece from the interior space.

11. The tailpiece attaching arrangement of claim 1, wherein the cylindrical attaching member comprises an opening for receiving the tailpiece.

12. The tailpiece attaching arrangement of claim 1, wherein the cylindrical attaching member comprises one or more opening holes to receive a tool to couple or uncouple the cylindrical attaching member with the cylindrical frame.

13. The tailpiece attaching arrangement of claim 1, wherein the hole of the cylindrical frame is in the vicinity of the groove.

* * * * *